(12) United States Patent
Wang

(10) Patent No.: US 12,122,601 B2
(45) Date of Patent: Oct. 22, 2024

(54) ARTICLE SORTING DEVICE

(71) Applicant: BEIJING JINGDONG QIANSHI TECHNOLOGY CO., LTD., Beijing (CN)

(72) Inventor: Jia Wang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 132 days.

(21) Appl. No.: 17/999,135

(22) PCT Filed: Mar. 22, 2021

(86) PCT No.: PCT/CN2021/082087
§ 371 (c)(1),
(2) Date: Nov. 17, 2022

(87) PCT Pub. No.: WO2021/238363
PCT Pub. Date: Dec. 2, 2021

(65) Prior Publication Data
US 2023/0192403 A1    Jun. 22, 2023

(30) Foreign Application Priority Data
May 28, 2020    (CN) .......................... 202010469552.2

(51) Int. Cl.
*B65G 1/06* (2006.01)
*B65G 1/04* (2006.01)
(Continued)

(52) U.S. Cl.
CPC ........... *B65G 1/065* (2013.01); *B65G 1/0492* (2013.01); *B65G 11/023* (2013.01); *B65G 17/18* (2013.01); *B65G 17/345* (2013.01)

(58) Field of Classification Search
None
See application file for complete search history.

(56) References Cited

U.S. PATENT DOCUMENTS 1,905,924 A * 4/1933 MacLauchlan ......... F26B 15/14
198/816
3,062,391 A   11/1962 Francois
(Continued)

FOREIGN PATENT DOCUMENTS

CN    206456846 U    9/2017
CN    108686965 A    10/2018
(Continued)

OTHER PUBLICATIONS

"Communication pursuant to Rules 70(2) and 70a(2) EPC", EP Application No. 21812742.1, Apr. 4, 2024, 1 p.
(Continued)

*Primary Examiner* — Kavel Singh
(74) *Attorney, Agent, or Firm* — Myers Bigel, P.A.

(57) ABSTRACT

The present disclosure relates to the technical field of logistics sorting, and in particular to a article sorting device. The article sorting device according to the present disclosure includes: a sorting track, including transition tracks and multiple layers of main tracks, wherein the transition track is connected to the same ends of the two adjacent layers of main tracks in a first direction, and the two adjacent transition tracks in a height direction are located at two ends of the main track in the first direction; and a sorting mechanism movably arranged on the sorting track to load an article, configured to unload the article in a second direction when moving to a set sorting position along the sorting track, wherein the second direction intersects the height direction and the first direction. Based on this, the occupied area of the article sorting device is effectively reduced.

16 Claims, 3 Drawing Sheets

(51) Int. Cl.
*B65G 11/02* (2006.01)
*B65G 17/18* (2006.01)
*B65G 17/34* (2006.01)

(56) References Cited

U.S. PATENT DOCUMENTS

| | | | |
|---|---|---|---|
| 4,635,785 A | | 1/1987 | Prydtz |
| 5,901,830 A | * | 5/1999 | Kalm .................... B65G 17/345 198/370.06 |
| 9,154,016 B2 | * | 10/2015 | Chierego .............. B65G 47/962 |
| 9,550,626 B2 | * | 1/2017 | Parodi ........................ B07C 3/08 |
| 10,179,695 B2 | * | 1/2019 | Battles ................. B65D 88/546 |
| 11,053,074 B2 | * | 7/2021 | Imamura ........... H01L 21/67715 |
| 11,975,362 B2 | * | 5/2024 | Xiao ......................... B07C 3/06 |
| 2004/0146381 A1 | * | 7/2004 | Hanson .................. B65G 15/14 414/306 |
| 2021/0016974 A1 | | 1/2021 | Cai et al. |

FOREIGN PATENT DOCUMENTS

| | | |
|---|---|---|
| CN | 109335538 A | 2/2019 |
| CN | 109573561 A | 4/2019 |
| CN | 209097596 U | 7/2019 |
| CN | 110282372 A | 9/2019 |
| CN | 110434075 A | 11/2019 |
| CN | 110639822 A | 1/2020 |
| CN | 210557532 U | 5/2020 |
| CN | 111776582 A | 10/2020 |
| CN | 212607340 U | 2/2021 |
| DE | 19957841 A1 | 6/2001 |
| EP | 0361340 A1 | 4/1990 |
| SU | 1719105 A1 | 3/1992 |
| WO | 2007088411 A1 | 8/2007 |

OTHER PUBLICATIONS

"Communication with Supplementary European Search Report", EP Application No. 21812742.1, Mar. 13, 2024, 7 pp.

"International Search Report and Written Opinion of the International Searching Authority with English language translation", International Application No. PCT/CN2021/082087, Jun. 22, 2021, 17 pp.

* cited by examiner

ARTICLE SORTING DEVICE

CROSS-REFERENCE TO RELATED APPLICATIONS

The present application is a U.S. National Stage Application under 35 U.S.C. § 371 of International Patent Application PCT/CN2021/082087, filed on Mar. 22, 2021, which itself claims priority to Chinese Patent application Ser. No. 202010469552.2, filed on May 28, 2020, the entire contents of both of which are incorporated herein by reference.

FIELD OF THE INVENTION

The present disclosure relates to the technical field of logistics sorting, and in particular to an article sorting device.

BACKGROUND OF THE INVENTION

In recent years, the logistics automation industry has developed rapidly, and various kinds of sorting and transmission equipment have appeared. At present, there are two main types of sorting machines, one is a loop sorting machine, and the other one is a linear sorting machine.

The loop sorting machine sorts articles through a horizontal oblong loop track. As to loop sorting machine, although numerous belt carts can run at the same time, the occupied area is large. The linear sorting machine adopts a longitudinal loop track. As to linear sorting machine, although the occupied area is smaller than that of the loop sorting machine, the occupied area is still larger, and the utilization rate of the belt carts is low.

SUMMARY OF THE INVENTION

One technical problem to be solved by the present disclosure is to reduce the occupied area of the article sorting device.

To solve the above technical problem, the present disclosure provides an article sorting device, including:

a sorting track, including transition tracks and multiple layers of main tracks, wherein the transition track is connected to the same ends of the two adjacent layers of main tracks in a first direction, and the two adjacent transition tracks in a height direction are located at two ends of the main track in the first direction; and a sorting mechanism movably arranged on the sorting track to load an article, configured to unload the article in a second direction when moving to a set sorting position along the sorting track, wherein the second direction intersects the height direction and the first direction.

In some embodiments, the sorting mechanism has a loading surface for placing the article, and the loading surface always faces upwards during movement of the sorting mechanism along the sorting track.

In some embodiments, the transition track includes a first transition part and a second transition part; the first transition part and the second transition part are arranged side by side in the second direction and spaced from each other; the sorting mechanism includes a first connecting part and a second connecting part, the sorting mechanism is coupled with the first transition part and the second transition part respectively through the first connecting part and the second connecting part, the first transition part is staggered with respect to the second transition part by a distance L towards a side of the first direction, and the first connection part is staggered with respect to the second connection part by the same distance toward the same side of the first direction.

In some embodiments, a magnetic pole plate is arranged at the bottom of the sorting mechanism, the article sorting device includes a motor, and the motor cooperates with the magnetic pole plate to drive the sorting mechanism to walk along the sorting track.

In some embodiments, the motor is provided with a groove extending in the first direction, and the magnetic pole plate passes through the groove during movement of the sorting mechanism along the sorting track.

In some embodiments, a guide part is arranged at an inlet of the groove, and the guide part is configured to guide the magnetic pole plate to enter the groove.

In some embodiments, the article sorting device includes a plurality of sorting mechanisms and a mounting bar, wherein an extension direction of the mounting bar is consistent with that of the sorting track, the mounting bar is configured to move relative to the sorting track, and the plurality of sorting mechanisms are arranged on the mounting bar side by side.

In some embodiments, a cavity is formed in the sorting track, and a side wall of the cavity is provided with an opening, the mounting bar is arranged in the cavity, and the sorting mechanism extends into the cavity from the opening and is connected to the mounting bar.

In some embodiments, the article sorting device includes a limiting piece, wherein the limiting piece is arranged on the mounting bar to limit a displacement of the sorting mechanism in the second direction.

In some embodiments, a first limiting wheel connected to the sorting mechanism is arranged on the mounting bar, the limiting piece includes a second limiting wheel, the first limiting wheel and the second limiting wheel are arranged at intervals in an extension direction of the mounting bar, and an axis of the first limiting wheel is perpendicular to an axis of the second limiting wheel.

In some embodiments, a plurality of first limiting wheels and a plurality of second limiting wheels are arranged on the mounting bar, and the plurality of first limiting wheels and the plurality of second limiting wheels are arranged sequentially in turn in the extension direction of the mounting bar.

In some embodiments, the transition tracks are arc-shaped tracks.

In some embodiments, in the multiple layers of main tracks, the main track located on the bottom layer is connected to one end, without the transition track, of the main track on the top layer through a return track.

In some embodiments, the return track is a linear track.

In some embodiments, the article sorting device includes a trolley wire, wherein the trolley wire is arranged on the sorting track, the sorting mechanism includes an electrical slip ring, and the electrical slip ring is electrically connected to the trolley wire.

In some embodiments, the article sorting device includes a chute, wherein the chute is arranged on the sorting track and located at the sorting position to receive the article unloaded by the sorting mechanism and guide the article to fall.

In some embodiments, the chutes are arranged on two sides of the sorting track in the second direction.

In some embodiments, the article sorting device includes a container, wherein the container is configured to receive the article falling from the chute.

The sorting track is configured to include the transition tracks and the multiple layers of main tracks, wherein the transition track is connected to the same ends in a first direction of two adjacent layers of main tracks, and t two adjacent transition tracks in a height direction are located at two ends of the main track in the first direction, and the sorting mechanism is configured to unload articles in the second direction intersecting the height direction and the first direction when moving to the set sorting position along the sorting track, so that the article sorting device according to the present disclosure becomes a three-dimensional storehouse type article sorting device, thereby effectively reducing the occupied area.

BRIEF DESCRIPTION OF THE DRAWINGS

The accompanying drawings described herein are used to provide further understanding of the present disclosure and constitute a part of the present disclosure. The schematic embodiments of the present disclosure and descriptions thereof are used to explain the present disclosure, and do not constitute an improper limitation to the present disclosure. In the accompanying drawings.

DETAILED DESCRIPTION OF THE EMBODIMENTS

The present disclosure is described hereinafter in detail. In the following paragraphs, different aspects of the embodiments are defined in detail. The aspects defined may be combined with one or more of any other aspects unless it is explicitly pointed that they cannot be combined. In particular, any features considered to be preferred or favorable may be combined with one or more of other features considered to be preferred or favorable combination.

The terms "first", "second" and the like appearing in the present disclosure are only configured to facilitate description so as to distinguish different components with the same name, but not to represent a sequence or a primary and secondary relationship.

In the description of the present disclosure, an azimuth or position relationship indicated by terms "upper", "lower", "top", "bottom", "front", "rear", "inner", "outer" and the like is an azimuth or position relationship based on the accompanying drawings, which is only for convenient description of the present disclosure, but not indicates or implies that the referred device must have a specific azimuth and perform construction and operation in the specific azimuth; therefore, it cannot be interpreted as a limitation to the protection scope of the present disclosure.

FIG. 1 to FIG. 8 exemplarily show an article sorting device 100 according to the present disclosure.

Referring to FIG. 1 to FIG. 8, the article sorting device 100 according to the present disclosure includes a sorting track 1 and a sorting mechanism 2.

Figure 1:
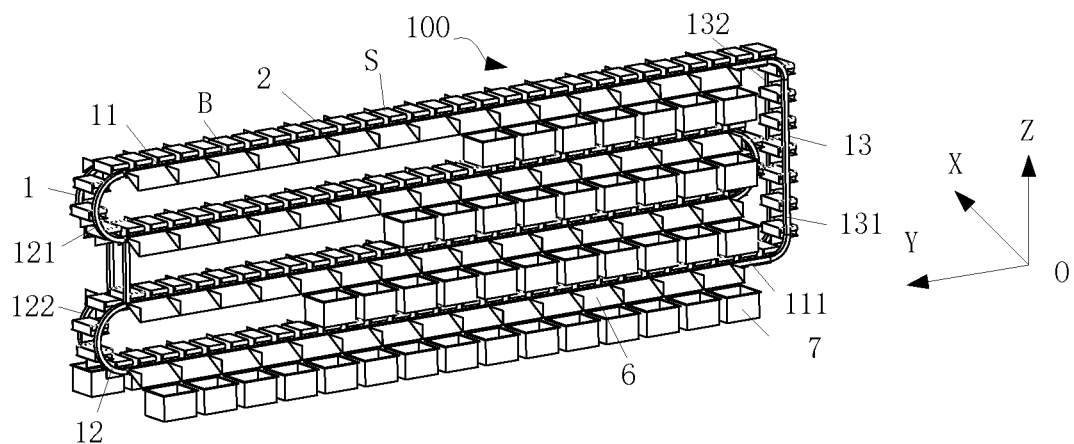
FIG. 1 is a three-dimensional diagram of an article sorting device according to some embodiments of the present disclosure.
Figure 2:
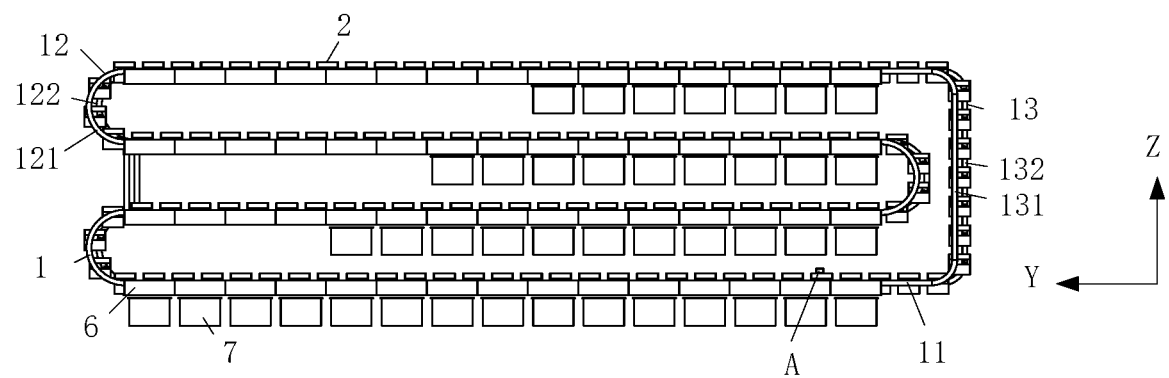
FIG. 2 is a front view of the article sorting device shown in FIG. 1.
Figure 3:
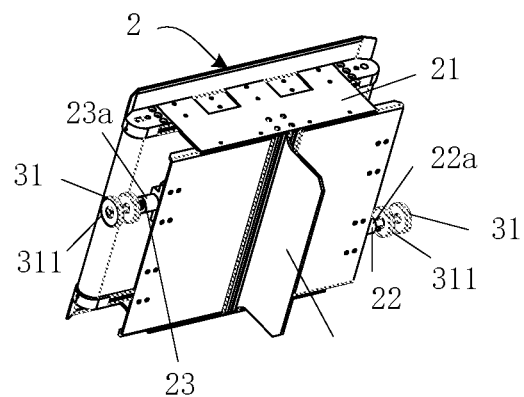
FIG. 3 is a first three-dimensional diagram of a sorting mechanism according to some embodiments of the present disclosure.
Figure 4:
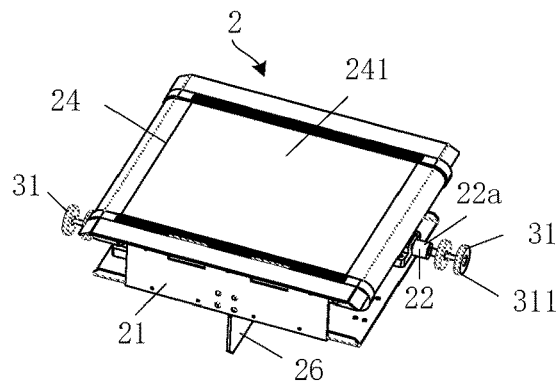
FIG. 4 is a second three-dimensional diagram of the sorting mechanism shown in FIG. 3.
Figure 5:
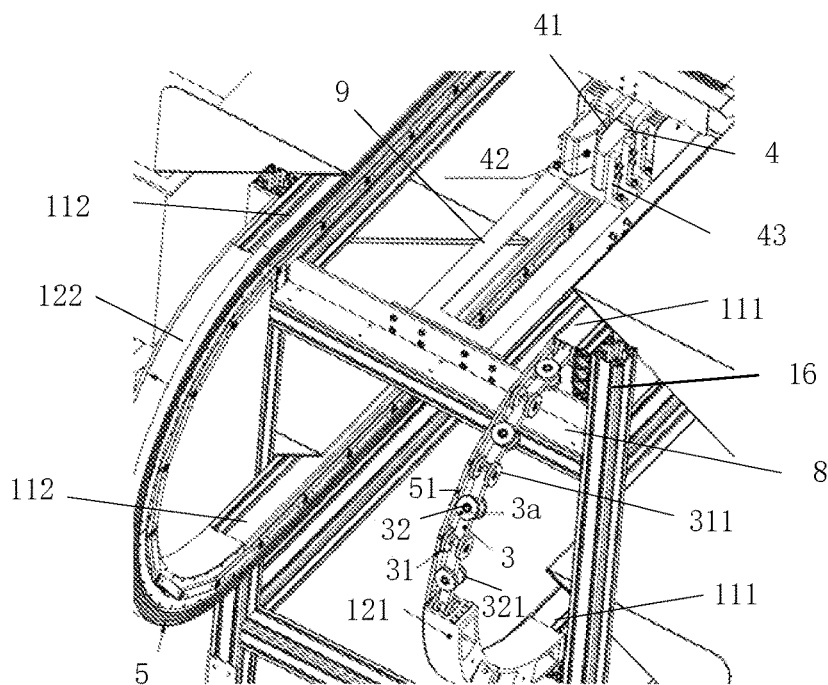
FIG. 5 is a partial three-dimensional diagram of an article sorting device according to some embodiments of the present disclosure.

The sorting track 1 is configured to bear the sorting mechanism 2 and limit a moving path of the sorting mechanism 2. Referring to FIG. 1, FIG. 2 and FIG. 5, in some embodiments, the sorting track 1 includes transition tracks 12 and multiple layers of main tracks 11. The multiple layers of main tracks 11 are arranged at intervals in a height direction Z. Each of the traditional tracks 12 is connected to the same ends of two adjacent layers of main tracks 11 in a first direction Y, and two adjacent transition tracks 12 in the height direction Z are located at two ends of the main track 11 in the first direction Y. The first direction Y is along an extension direction of the main tracks 11. On such basis, the sorting track 1 is configured as a multi-layer track that rotates upward in a roughly S shape and cooperates with the sorting mechanism 2 to realize sorting operation, thereby realizing the occupied area and improving a space utilization rate. Furthermore, the structure form that rotates upwards in the roughly S shape is beneficial to make a motion inertia of the whole article sorting device 100 more balanced, improve the stress and reduce the vibration.

Both the main track 11 and the transition track 12 may be any one of a linear track or a curved track. In addition, the main tracks 11 may be arranged horizontally, or may be arranged inclined in a vertical plane. For example, referring to FIG. 1 to FIG. 2, in some embodiments, the main tracks 11 are horizontally arranged linear tracks, and the transition tracks 12 are arc-shaped tracks. In this case, the sorting track 1 has a simpler structure and is more convenient to guide the sorting mechanism 2 to move efficiently and stably.

Specifically, referring to FIG. 1, FIG. 2 and FIG. 5, in some embodiments, each of the main tracks 11 includes a first main body part 111 and a second main body part 112, and the first main body part 111 and the second main body part 112 are arranged at intervals in a second direction X. The second direction X intersects the height direction Z and the first direction Y. The first main body parts 111 of the multiple layers of main tracks 11 are configured to face each other up and down, and the second main body parts 112 of the multiple layers of main tracks 11 are configured to face each other up and down. Different first main body parts 111, different second main body parts 112, and the first main body parts 111 and the second main body parts 112 may be configured to have the same structure, so as to simplify the structure. For example, referring to FIG. 1, in some embodiments, the first main body parts 111 and the second main body parts 112 are all linear tracks extending horizontally, and the first main body parts 111 and the second main body parts 112 have the same size. In this case, all the main tracks 11 are linear tracks having the same size and extending horizontally.

Continuing to refer to FIG. 1, FIG. 2 and FIG. 5, in some embodiments, each of the transition tracks 12 includes a first transition part 121 and a second transition part 122, and the first transition part 121 and the second transition part 122 are arranged at intervals in the second direction X. The first transition part 121 is connected to the first main body part 111 of adjacent layers. The second transition part 122 is connected to the second main body part 112 of adjacent layers. The first transition parts 121 of the transition tracks 12 on different layers are configured to face each other up and down, and the second transition parts 122 of the transition tracks 12 on different layers are configured to face each other up and down. Different first transition parts 121, different second transition parts 122, and the first transition parts 121 and the transition parts 122 may adopt the identical structure, thereby simplifying the structure. For example, referring to FIG. 1, in some embodiments, the first transition parts 121 and the second transition parts 122 are all arc-shaped tracks, and the first transition parts 121 and the second transition parts 122 have the same size. In this case, all the transition tracks 12 are arc-shaped tracks having the same size.

All the first main body parts 111 and all the first transition parts 121 are collectively referred to as a first track member, and all the second main body parts 112 and all the second transition parts 122 are collectively referred to as a second track member, thereby facilitating distinguishment and subsequent description. It is not difficult to understand that the first track member and the second track member are arranged at intervals in the second direction X; the first track member includes multiple layers of first main body parts 111, and first transition parts 121 connected between the adjacent layers of first main body parts 111; and the second track member includes multiple layers of second main body parts 112, and second transition parts 122 connected between the adjacent layers of second main body parts 112.

In order to enhance structural stability of the sorting track 1, referring to FIG. 5, in some embodiments, a supporting bracket 8 is arranged on the first main body part 111 and the second main body part 112 on the same layer, and the supporting bracket 8 is connected to the first main body part 111 and the second main body part 112 on the same layer. The supporting bracket 8 is supported between the first main body part 111 and the second main body part 112 on the same layer, so that a distance between the first main body part 111 and the second main body part 112 on the same layer is kept, and the structure of the sorting track 1 is firmer and more stable. Of course, as a modification, the supporting bracket 8 may be arranged between the first transition part 121 and the second transition part 122 on the same layer (that is, between the first transition part 121 and the second transitional 122 of the same transition track 12), or the supporting brackets 8 may be arranged between the first main body part 111 and the second main body part 112 on the same layer, and between the first transition part 121 and the second transition part 122 on the same layer, so as to enhance the structural stability of the sorting track 1.

The sorting mechanism 2 is configured to load articles A and sort the articles A. Referring to FIG. 1 to FIG. 7, in some embodiments, the sorting mechanism 2 is movably arranged on the sorting track 1, loads articles A, and is configured to unload the loaded articles A when moving to a set sorting position B along the sorting track 1. When moving along the sorting track 1, moving directions of the sorting mechanism 2 on the two adjacent layers of main tracks 11 are opposite. On such basis, the article sorting device 100 becomes a multi-layer three-dimensional storehouse type linear sorting machine under the cooperation of the sorting mechanism 2 and the sorting track 1 that rotates upwards in the roughly S shape, so that the space utilization rate is effectively increased, and the occupied area is saved by many times, which facilitates arranging more article sorting devices 100 in the same space, thereby improving sorting efficiency article sorting device, or adding other devices in the same space, thereby enriching types of the devices in the same space. Meanwhile, the multi-layer article sorting device 100 can perform multi-layer sorting operations at the same time, and can better meet requirements of heavier sorting tasks or more sorting types.

In order to enable the sorting mechanism 2 to unload articles A, referring to FIG. 3 to FIG. 6, the sorting mechanism 2 includes a mechanism body 21 and an unloading mechanism 24, and the unloading mechanism 24 is arranged on the mechanism body 21 to drive the articles A to move relative to the mechanism body 21 in the second direction X, so that the articles A is separated from the sorting mechanism 2 and a transfer function is achieved. In some embodiments, the unloading mechanism 24 is configured as a belt conveying mechanism, for example, an electrical roller belt mechanism, including a belt 241 and an electrical roller (not shown in the figure), wherein the belt 241 is driven by the electrical roller to rotate to unload the articles A.

In order to realize the arrangement of the sorting mechanism 2 on the sorting track 1, referring to FIG. 3 to FIG. 6, the sorting mechanism 2 includes a first connecting part 22 and a second connecting part 23. The first connecting part 22 and the second connecting part 23 are located on two opposite sides of the sorting mechanism 2 (specifically, the mechanism body 21) in the second direction X. The sorting mechanism 2 is coupled to two sides of the sorting track 1 along the second direction X through the first connecting part 22 and the second connecting part 23, respectively. When the sorting track 1 includes the first track member and the second track member, the two sides of the sorting track 1 along the second direction X are the first track member and the second track member. In this case, the sorting mechanism 2 is coupled with the first track member through the first connecting part 22, and is coupled with the second track member through the second connecting part 23. When passing through the transition track 12, the sorting mechanism 2 is coupled with the first transition part 121 through the first connecting part 22, and is coupled with the second transition part 122 through the second connecting part 23.

In some embodiments, the first main body part 111 and the second main body part 112 which are located on the same layer have the same height and are parallel with each other. This structure is convenient to realize the movement of the sorting mechanism 2, so that the sorting mechanism 2 is more stable and reliable in the moving process. In this case, the first connecting part 22 and the second connecting part 23 also have the same height.

In some other embodiments, the first main body part 111 and the second main body part 112 that are located on the same layer have a height difference. In this case, the first connecting part 22 and the second connecting part 23 also have a height difference.

A surface, for placing articles A, of the sorting mechanism 2 is referred to as a loading surface S. The loading surface S may be an upper surface of the unloading mechanism 24. Referring to FIG. 1 and FIG. 2, in some embodiments, the loading surface S always faces upwards in the moving processing of the sorting mechanism 2 along the sorting track 1. In this case, the loading surface S can be kept upward not only when the sorting mechanism 2 passes through the main tracks 11, but also when the sorting mechanism 2 passes through the transition tracks 12, therefore, the articles A can be prevented from falling from the sorting mechanism 2, such that even if a member specially for fixing the articles A is not arranged between the sorting mechanism 2 and the articles A, or even if the articles A are directly placed on the loading surface instead of being additionally fixed, the articles A are not easy to fall from the sorting mechanism 2 in the whole process that the sorting mechanism 2 moves along the sorting track 1, especially when the sorting mechanism 2 passes through the transition tracks 12, thereby facilitating the sorting mechanism 2 to convey the articles A more stably, and effectively improving the sorting efficiency.

In order to enable the loading surface S to always face upwards in the moving process of the sorting mechanism 2 along the sorting track 1, referring to FIG. 1 to FIG. 2 and FIG. 5 to FIG. 6, in some embodiments, the first transition part 121 and the second transition part 122, and the first transition part 121 is staggered with respect to the second transition part 122 by a distance L towards a side of the first direction Y, and the first connection part 22 is staggered with respect to the second connection part 23 by the same distance toward the same side of the first direction Y. In other words, the staggered distance between the first transition part 121 and the second transition part 122 in the first direction Y is equal to the staggered distance between the first connecting part 22 and the second connecting part 23 in the first direction Y, and the staggered direction of the first transition part 121 relative to the second transition part 122 is as same as the staggered direction of the first connecting part 22 relative to the second connecting part 23.

The first transition part 121 and the second transition part 122 are staggered in the first direction Y, and the first connecting part 22 and the second connecting part 23 of the sorting mechanism 2 connected to two sides of the sorting track 1 are staggered, and the staggered distances and the staggered directions are the same, therefore, the sorting mechanism 2 can be prevented from overturning when passing through the transition track 12, the orientation of the loading surface S of the sorting mechanism 2 is prevented from changing, such that the loading surface S can be always kept upward, and the articles A can be conveyed stably.

Furthermore, the loading surface S always faces upwards, so that the sorting mechanism 2 can perform a sorting task on each layer of the sorting track 1, that is, the sorting mechanism 2 can sort articles in the whole movement process. Therefore, it is beneficial to increase the utilization rate of the sorting mechanism 2, thereby improving the sorting efficiency of the article sorting device 100.

As mentioned above, in some embodiments, the dimensions of the first body portion 111 and the second body portion 112 and the dimensions of the first transition portion 121 and the second transition portion 122 are respectively the same, that is, the first main body part 111 and the second main body part 112 have the same length, and the first transition part 121 and the second transition part 122 have the same length. In this case, if the first transition part 121 of the transition track 12 connected to the first end of the main track 11 in the first direction Y extends by the distance L from the second transition portion 122 toward a direction away from the second end of the main body rail 11 along the first direction Y, the first transition part 121 of the transition track 12 connected to the second end of the main track 11 in the first direction Y retracts by the distance L from the second transition portion 122 toward a direction away from the second end of the main body rail 11 along the first direction Y. For example, in FIG. 2, the first transition part 121 of the transition track 12 located on the left side extends leftwards by the distance L relative to the second transition part 122, and the first transition part 121 of the transition track 12 located on the right side retracts leftwards by the distance L relative to the second transition part 122.

To improve the sorting efficiency, referring to FIG. 1 to FIG. 2, in some embodiments, the article sorting device 100 includes a plurality of sorting mechanisms 2, and the plurality of sorting mechanisms 2 are arranged side by side. FIG. 2 only shows that one of the sorting mechanisms 2 are provided with articles A, but it can be understood that this is only a simplified drawing method. During actual work, each sorting mechanism 2 may be provided with articles A, so that these sorting mechanisms 2 can perform sorting tasks at the same time, thereby improving the sorting efficiency.

Different sorting mechanisms 2 may bear articles A with the same or different sorting categories. For example, the articles A that need to be delivered to different destinations may be loaded by different sorting mechanisms 2, and different sorting positions B are set for these different sorting mechanisms 2. Each sorting mechanism 2 is controlled to run along the sorting track 1 to the sorting position B corresponding to the loaded articles A, and the articles A are unloaded, thereby realizing sorting of the articles A.

Figure 6:
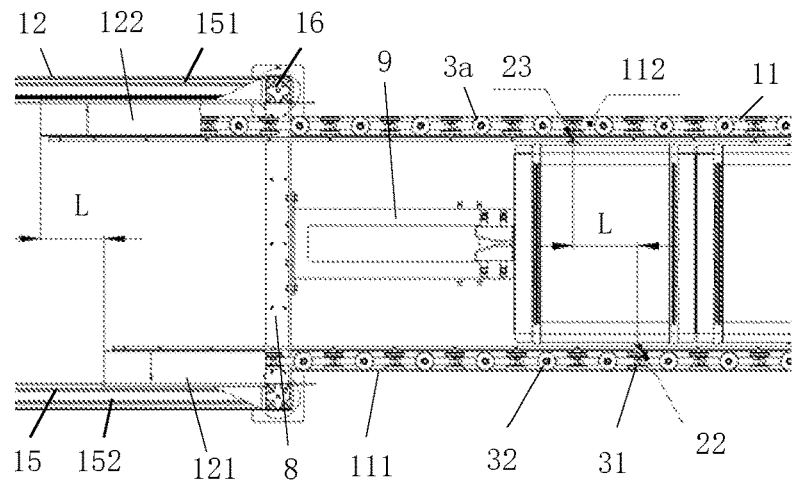
FIG. 6 is a partial top view of an article sorting device according to some embodiments of the present disclosure.
Figure 7:
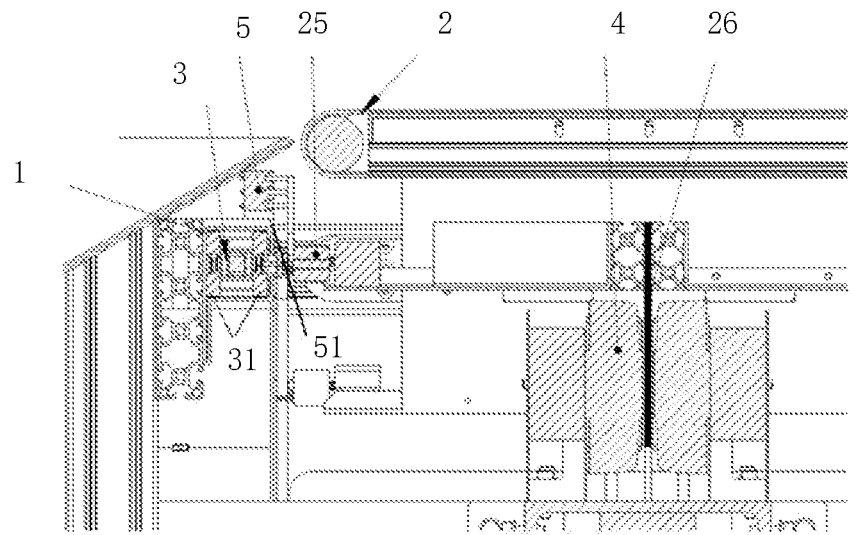
FIG. 7 is a schematic diagram of a partial structure when an article sorting device is sectioned along a surface perpendicular to a second direction according to some embodiments of the present disclosure.
Figure 8:
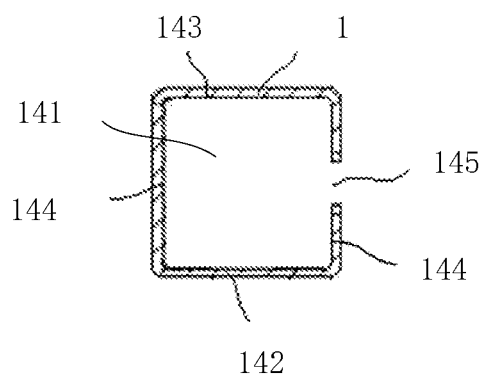
FIG. 8 is a cross section of a sorting track according to some embodiments of the present disclosure.

When a plurality of sorting mechanisms 2 are provided, referring to FIG. 5 to FIG. 7, in some embodiments, the article sorting device 100 includes a mounting bar 3, an extension direction of the mounting bar 3 is consistent with that of the sorting track 1 and the mounting bar 3 is configured to be movable relative to the sorting track 1, and all the sorting mechanisms 2 are arranged on the mounting bar 3 side by side. In this case, the mounting bar 3 is moved relative to the sorting track 1, then all the sorting mechanisms 2 are driven together to move relative to the sorting track 1, which is simple and convenient.

Referring to FIG. 3 to FIG. 7, in some embodiments, a magnetic pole plate 26 is arranged at the bottom of the sorting mechanism 2, the article sorting device 100 includes a motor 4, and the motor 4 cooperates with the magnetic pole plate 26 to drive the sorting mechanism 2 to walk along the sorting track 1.

Specifically, in some embodiments, the magnetic pole plate 26 is arranged at the bottom of the mechanism body 21. The motor 4 is a linear motor and is fixedly arranged relative to the sorting track 1. For example, the motor 4 is arranged between the first main body part 111 and the second main body part 112 and is connected to the mounting bracket 9 which is fixed on the supporting bracket 8 through a connecting frame 43. Furthermore, the motor 4 is provided with a groove 41 extending along the first direction Y, and the magnetic pole plate 26 passes through the groove 41 in the moving process of the sorting mechanism 2 along the sorting track 1.

Based on the magnetic pole plate 26 and the motor 4, when the sorting mechanism 2 passes through the motor 4, the magnetic pole plate 26 can be inserted into the groove 41 and cut magnetic induction lines to generate electric energy, so that the sorting mechanism 2 passing through the motor 4 can obtain the electric energy to drive the sorting mechanism 2 to move on the sorting track 1. Furthermore, in a case that the plurality of sorting mechanisms 2 are arranged on the mounting bar 3 side by side, when the sorting mechanism 2 located at the front in the moving direction is driven by the motor 4 to move, the mounting bar 3 can be driven to move, so that the mounting bar 3 can drive the rear sorting mechanism 2 to move forward continuously to pass through the motor 4 and be driven by the motor 4 again. In this way, all the sorting mechanisms 2 are connected in series, each sorting mechanism 2 can pass through the motor 4 and be powered by the motor 4, so that all the sorting mechanisms 2 can move along the sorting track 1. In this driving mode, it is unnecessary to arrange other transmission mechanisms such as sprockets, so the structure is simple, and it is convenient to realize the lightweight of the article sorting device 100.

The number of the motors 4 may be set according to the required driving force, for example, each layer may be provided with one, two or more motors 4.

To facilitate the magnetic pole plate 26 to enter the groove 41, referring to FIG. 5, in some embodiments, a guide part 42 is arranged at an inlet of the groove 41, and the guide part 42 is configured to guide the magnetic pole plate 26 to enter the groove 41. Specifically, the guide part 42 makes the inlet of the groove 41 to form a V-shaped channel with a width being gradually reduced in an entering direction. In this way, the magnetic pole plate 26 can enter the groove 41 more smoothly to obtain power, each sorting mechanism 2 can run more smoothly, and running stagnation is avoided, so that the work reliability of the article sorting device 100 and the sorting efficiency are improved.

In order to make the whole structure more compact, referring to FIG. 5 to FIG. 8, in some embodiments, a cavity 141 is formed in the sorting track 1, a side wall 144 of the cavity 141 is provided with an opening 145, the mounting bar 3 is arranged in the cavity 141, and the sorting mechanism 2 extends into the cavity 141 from the opening 145 and is connected to the mounting bar 3. In this case, the mounting bar 3 is arranged in the sorting track 1, therefore, with respect to other cases where the mounting bar 3 is arranged outside the sorting track 1, the structure is more compact and the appearance is flatter, what's more, a cavity wall of the cavity 141 can play a certain role in limiting the mounting bar 3, and the movable arrangement of the mounting bar 3 relative to the sorting track 1 can be realized conveniently. For example, the mounting bar 3 is directly placed in the cavity 141, then the movable arrangement relative to the sorting track 1 is realized.

A cross section of the sorting track 1 (that is, cross sections of the first main body part 111, the second main body part 112, the first transition part 121 and the second transition part 122) may be a circle with an opening 145. In this case, the cross section of the sorting track 1 is C-shaped. Or referring to FIG. 8, the cross section of the sorting track 1 may be of other shapes such as a square with an opening 145. The opening 145 specifically faces a space between the first main body part 111 and the second main body part 112 (that is, the space between the first transition part 121 and the second transition part 122), thereby facilitating insertion of the sorting mechanism 2.

The parts of the sorting mechanism 2 are inserted into the cavity 141 are specifically the first connecting part 22 and the second connecting part 23. Referring to FIG. 3 to FIG. 8, in some embodiments, a first limiting wheel 31 is arranged on the mounting bar 3, and the first limiting wheel 31 is connected to the sorting mechanism 2. Specifically, the first limiting wheel 31 is connected with the first connecting part 22 or the second connecting part 23 to realize the connection with the sorting mechanism 2. The first connecting part 22 and the second connecting part 23 are inserted into the cavity 141 from the opening 145, and connected to the first limiting wheel 31 which is located in the cavity 141 and arranged on the mounting bar 3. In this case, the first connecting part 22 includes a first connecting shaft 22a, and the second connecting part 23 includes a second connecting shaft 23a. The first connecting shaft 22a and the second connecting shaft 23a may be arranged on a lower part of the mechanism body 21, and inserted into the cavity 141 from the opening 145 to be coaxially connected to the first limiting wheel 31.

Referring to FIG. 7, a peripheral surface of the first limiting wheel 31 is at least in contact with an inner surface of a bottom wall 142 of the cavity 141. Under a condition of high cooperation precision, the peripheral surface of the first limiting wheel 31 may also be in contact with an inner surface of a top wall 143 of the sorting track 1 to provide a stable supporting force to the first limiting wheel 31, so that the sorting mechanism 2 moves more stably and smoothly.

In order to prevent the first limiting wheel 31 from inclining during movement, referring to FIG. 5, in some embodiments, the first limiting wheel 31 includes two first wheel bodies 311 coaxially arranged at intervals. The two first wheel bodies 311 are arranged at intervals in a width direction of the mounting bar 3, and are respectively clamped on two opposite sides of the mounting bar 3 in the width direction.

The first limiting wheel 31 can prevent the sorting mechanism 2 from jumping in the height direction Z, and can position the sorting mechanism 2 to keep a distance between the adjacent sorting mechanisms 2.

In addition, referring to FIG. 5 and FIG. 6, in some embodiments, the article sorting device 100 includes a limiting piece 3a, and the limiting piece 3a is arranged on the mounting bar 3 for limiting the displacement of the sorting mechanism 2 in the second direction X. On such basis, the limiting piece 3a can limit a deviation of the sorting mechanism 2 in the second direction X, and can position the sorting mechanism 2 to keep a distance between the adjacent sorting mechanisms 2.

Continuously referring to FIG. 5 and FIG. 6, in some embodiments, the limiting piece 3a includes a second limiting wheel 32, the second limiting wheel 32 is spaced from the first limiting wheel 31 in the extension direction of the mounting bar 3, and an axis of the second limiting wheel 32 is perpendicular to an axis of the first limiting wheel 31. For example, when the axis of the first limiting wheel 31 is along a width direction of the mounting bar 3, the axis of the second limiting wheel 32 is along a thickness direction of the mounting bar 3. A peripheral surface of the second limiting wheel 32 is in contact with the side wall 144 of the sorting track 1.

The second limiting wheel 32 prevents the sorting mechanism 2 from deflecting in the second direction X in the movement process, and improves the movement stability of the sorting mechanism 2.

In order to prevent the second limiting wheel 32 from inclining in the movement process, the second limiting wheel 32 includes two second wheel bodies 321 coaxially arranged at intervals, and the two second wheel bodies 321 are arranged at intervals in the thickness direction of the mounting bar 3 and are respectively clamped on two opposite surfaces of the mounting bar 3 in the thickness direction.

Still referring to FIG. 5 and FIG. 6, in some embodiments, a plurality of first limiting wheels 31 and a plurality of second limiting wheels 32 are arranged on the mounting bar 3, and the plurality of first limiting wheels 31 and the plurality of second limiting wheels 32 are sequentially arranged in turn in the extension direction of the mounting bar 3. Distances between the adjacent first limiting wheel 31 and second limiting wheel 32 are equal. In this way, the adjacent sorting mechanisms 2 are kept at a preset distance more reliably, and all the sorting mechanisms 2 move more stably.

Referring to FIG. 1 and FIG. 2, in some embodiments, the article sorting device 100 includes a chute 6. The chute 6 is arranged on the sorting track 1 and located at the sorting position B to receive the article A unloaded by the sorting mechanism 2 and guide the article A to fall. The chute 6 forms a lattice and guides the article A sorted by the sorting mechanism 2 to fall, so that the article A can fall to a predetermined position more accurately. The chute 6 may be specifically configured to incline downwards.

Continuously referring to FIG. 1 and FIG. 2, in some embodiments, sorting positions B are preset on different layers of the sorting track 1, for example, a plurality of sorting positions B are arranged on each layer of main tracks 11. In this case, the article sorting device 100 may include multiple layers of chutes 6 so as to completely utilize the space in the height direction, and increase the number of the lattices in the height direction under the condition of the same occupied area, so that the sorting efficiency is improved, or more sorting types are provided, thereby making the sorting process more flexible.

The sorting mechanism 2 can perform the sorting task on each layer of main track 11, therefore, each layer of main track 11 is provided with the chute 6, such that the article sorting device 100 has multiple layers of chutes 6, which can more fully Utilize all sorting mechanisms 2 to improve sorting efficiency more effectively.

Baffles are arranged on two sides of the chute 6 in the first direction Y to prevent the article A from entering the adjacent chute 6 or fall out of the chute 6, so that the article A can be sorted to a predetermined area more accurately. The adjacent chutes 6 may share the baffle.

A width of the chute 6 (the size in the first direction Y) may be greater than the width of the sorting mechanism 2, so that the articles falling from the sorting mechanism 2 enters the chute 6 smoothly.

The chute 6 may only be arranged on one side of the sorting track 1 in the second direction X, or may be arranged on two sides of the sorting track 1 in the second direction X. For example, in some embodiments, the chute 6 is arranged on the outer side of only one of the first main body part 111 and the second main body part 112, and in this case, each layer of chutes 6 only include one row of chutes 6. Referring to FIG. 1, in some other embodiments, the chutes 6 are arranged on the outer sides of the first main body part 111 and the second main body part 112, and in this case, each layer of chutes 6 include two rows of chutes 6, and the number of slideways 6 is larger, such that the space of the article sorting device 100 in the second direction X is fully utilized thereby further improving the sorting efficiency, or providing more sorting types.

Furthermore, referring to FIG. 1 and FIG. 2, in some embodiments, the article sorting device 100 includes a container 7, and the container 7 is configured to receive the article A falling from the chute 6.

To facilitate the display of the sorting mechanism 2, only some of the containers 7 are shown in FIG. 1 and FIG. 2, but it should be understood that the containers 7 and the chutes 6 may be arranged in a one-to-one correspondence manner. When there are multiple layers of chutes 6, there may be multiple layers of containers 7. Referring to FIG. 1, the bottom layer of the containers 7 may be directly placed on the ground. Other layers of containers 7 may be placed on a supporting frame (not shown in the figure).

The sorting track 1 is a multi-layer track and the containers 7 are located at a higher position, therefore, in order to facilitate replacement of the containers 7, the following measures may be taken: (1) a steel platform with the same height and layers as the article sorting device 100 is built, and manual replacement is adopted; (2) the containers 7 are replaced by a plurality of high-order forklift trucks which may be unmanned forklift trucks; (3) two sides of the sorting track 1 in the second direction X are respectively provided with a group of stacking machines to automatically replace the containers 7; or (4) a roller line transfer machine and a continuous lifting machine are arranged at each chute 6 to realize automatic in and out replacement of the containers 7.

In addition, referring to FIG. 5 and FIG. 7, in some embodiments, the article sorting device 100 includes a trolley wire 5 arranged on the sorting track 1, the sorting mechanism 2 includes an electrical slip ring 25, and the electrical slip ring 25 is electrically connected to the trolley wire 5.

The sorting mechanism 2 is movable relative to the sorting track 1, therefore, power supply and communication to the moving sorting mechanism 2 is more reliably realized by supplying power through cooperation of the electrical slip ring 25 and the trolley wire 5. Electric energy provided by the trolley wire 5 may be used to drive the unloading mechanism 24, or may be used for the sorting mechanism 2 to communicate with a scheduling system.

In order to mount the trolley wire 5, a supporting piece 51 may be arranged on the side wall 144, having the opening 145, of the sorting track 1. The supporting piece 51 may be of a plate-shaped structure or a rod-shaped structure, and is fixed on the side wall 144, having the opening 145, of the sorting track 1. The trolley wire 5 is fixed on the supporting piece 51. Based on this, the trolley wire 5 is closer to the sorting mechanism 2, thereby facilitating contact between the trolley wire 5 and the electrical slip ring 25.

In some embodiments, two trolley wires 5 are respectively arranged on the first track member and the second track member, an electrical slip ring 25 is arranged on each of two sides of the sorting mechanism 2 in the second direction X, and the electrical slip rings 25 on two sides are respectively in contact with the trolley wires 5 on two sides, thereby providing power supply and communication for the sorting mechanism 2 reliably and realizing the sorting process more smoothly.

The article sorting device 100 provided by the present disclosure may be used to sort goods when entering and leaving a warehouse, or may be used to sort parcels. The working process may be as follows:

as shown in FIG. 1, a plurality of sorting mechanisms 2 are spaced apart by the preset distance in the extension direction of the sorting track 1, and articles A are arranged on each sorting mechanism 2. Taking sorting of packaged parcels as an example, the scheduling system determines the sorting type according to the delivery region of the parcels. For example, some of the containers 7 are used to receive the parcels to be delivered to region R1, some containers 7 are used to receive the parcels to be delivered to region R2, and so on. When the sorting mechanism 2 moves to the corresponding container 7 bearing the parcel, the unloading mechanism 24 on the sorting mechanism 2 is started, so that the parcel falls into the corresponding container 7 from the chute 6 on one side. Alternatively, a tipping bucket may be adopted, and the articles are unloaded by lifting one end of the tipping bucket. When an idle sorting mechanism 2 appears, the articles A may be loaded again and may be sorted continuously.

In addition, referring to FIG. 1 and FIG. 2, in some embodiments, the sorting track 1 includes a return track 13. In the multiple layers of main tracks 11, one end, not provided with the transition track 12, of the main track 11 located on a bottommost layer is connected to one end, not provided with the transition track 12, of the main track 11 located on a topmost layer through the return track 13.

Through the return track 13, the whole sorting track 1 forms a closed ring, and the sorting mechanisms 2 can return to the bottommost layer of main track 11 through the return track 13 after running from the bottommost layer of main track 11 to the topmost layer of main track 11, so that a whole circulating movement can be realized, and each sorting mechanism 2 can be recycled.

The return track 13 may be a linear track or a curved track. For example, referring to FIG. 1 and FIG. 2, in some embodiments, the return track 13 is a linear track, and in this case, the structure is simpler and more stable.

In addition, as an improvement of the article sorting device 100 shown in FIG. 1, referring to FIG. 5 and FIG. 6, in some embodiments, the article sorting device 100 includes a protective cover 15, and the protective cover 15 is arranged on at least one side of the sorting track 1 in the first direction Y, so that the running safety of the article sorting device 100 is improved.

Referring to FIG. 6, in some embodiments, the protective cover 15 includes a first plate 151, a second plate 152 and a third plate (not shown in the figure), and the first plate 151 and the second plate 152 are connected to two opposite sides of the third plate, so that the cross section of the protective cover 15 is roughly U-shaped. During mounting, the first plate 151 and the second plate 152 are located on two sides of the sorting track 1 in the second direction X, and the third plate is located on one side of the sorting track 1 in the first direction Y.

Continuously referring to FIG. 6, in some embodiments, the protective cover 15 is mounted on upright columns 16. For example, two upright columns 16 are arranged on two sides of the sorting track 1 in the second direction X, and the first plate 151 and the second plate 152 are respectively fixedly connected to the two upright columns 16, so that the upright columns 16 are used to support and fix the protective cover 15.

It should be noted that FIG. 5 omits the protective cover 15, and FIG. 6 only shows part of the protective cover 15.

The article sorting device provided by the present disclosure is described in detail. The principle and embodiments of the present disclosure are elaborated by specific embodiments, and the description of the above embodiments is only intended to help understand the method of the present disclosure and the core concept thereof. It should be point out that for those of ordinary skill in the art, several improvements and modifications may be made to the present disclosure without departing from the principle of the present disclosure, and also fall into the protection scope of the claims of the present disclosure.

The invention claimed is:

1. An article sorting device, comprising:
a sorting track, comprising transition tracks and multiple layers of main tracks, wherein the transition track is connected to the same ends of the two adjacent layers of main tracks in a first direction, the two adjacent transition tracks in a height direction are located at two ends of the main track in the first direction, wherein a cavity is formed in the sorting track, and a side wall of the cavity is provided with an opening;
a mounting bar, wherein an extension direction of the mounting bar is consistent with that of the sorting track, and the mounting bar is arranged in the cavity and is configured to move relative to the sorting track; and
a plurality of sorting mechanisms arranged on the mounting bar side by side, so as to be movably arranged on the sorting track to load an article, configured to unload the article in a second direction when moving to a set sorting position along the sorting track, wherein the sorting mechanism extends into the cavity from the opening and is connected to the mounting bar, and the second direction intersects the height direction and the first direction.

2. The article sorting device according to claim 1, wherein the sorting mechanism has a loading surface for placing the article, and the loading surface always faces upwards during movement of the sorting mechanism along the sorting track.

3. The article sorting device according to claim 2, wherein the transition track comprises a first transition part and a second transition part; the first transition part and the second transition part are arranged side by side in the second direction and spaced from each other; the sorting mechanism comprises a first connecting part and a second connecting part, the sorting mechanism is coupled with the first transition part and the second transition part respectively through the first connecting part and the second connecting part, the first transition part is staggered with respect to the second transition part by a distance L towards a side of the first direction, and the first connection part is staggered with respect to the second connection part by the same distance toward the same side of the first direction.

4. The article sorting device according to claim 1, wherein a magnetic pole plate is arranged at the bottom of the sorting mechanism, the article sorting device comprises a motor, and the motor cooperates with the magnetic pole plate to drive the sorting mechanism to walk along the sorting track.

5. The article sorting device according to claim 4, wherein the motor is provided with a groove extending in the first direction, and the magnetic pole plate passes through the groove during movement of the sorting mechanism along the sorting track.

6. The article sorting device according to claim 5, wherein a guide part is arranged at an inlet of the groove, and the guide part is configured to guide the magnetic pole plate to enter the groove.

7. The article sorting device according to claim 1, comprising a limiting piece, wherein the limiting piece is arranged on the mounting bar to limit a displacement of the sorting mechanism in the second direction.

8. The article sorting device according to claim 7, wherein a first limiting wheel connected to the sorting mechanism is arranged on the mounting bar, the limiting piece comprises a second limiting wheel, the first limiting wheel and the second limiting wheel are arranged at intervals in an extension direction of the mounting bar, and an axis of the first limiting wheel is perpendicular to an axis of the second limiting wheel.

9. The article sorting device according to claim 8, wherein a plurality of first limiting wheels and a plurality of second limiting wheels are arranged on the mounting bar, and the plurality of first limiting wheels and the plurality of second limiting wheels are arranged sequentially in turn in the extension direction of the mounting bar.

10. The article sorting device according to claim 1, wherein the transition tracks are arc-shaped tracks.

11. The article sorting device according to claim 1, wherein in the multiple layers of main tracks, the main track located on the bottom layer is connected to one end, without the transition track, of the main track on the top layer through a return track.

12. The article sorting device according to claim 11, wherein the return track is a linear track.

13. The article sorting device according to claim 1, comprising a trolley wire, wherein the trolley wire is arranged on the sorting track, the sorting mechanism comprises an electrical slip ring, and the electrical slip ring is electrically connected to the trolley wire.

14. The article sorting device according to claim 1, comprising a chute, wherein the chute is arranged on the sorting track and located at the sorting position to receive the article unloaded by the sorting mechanism and guide the article to fall.

15. The article sorting device according to claim 14, wherein the chutes are arranged on two sides of the sorting track in the second direction.

16. The article sorting device according to claim 14, comprising a container, wherein the container is configured to receive the article falling from the chute.

* * * * *